(12) United States Patent
Bajko et al.

(10) Patent No.: US 7,843,948 B2
(45) Date of Patent: Nov. 30, 2010

(54) METHOD OF COMMUNICATION

(75) Inventors: Gábor Bajko, Budapest (HU); Aki Niemi, Helsinki (FI); Valtteri Niemi, Helsinki (FI)

(73) Assignee: Nokia Corporation, Espoo (FI)

( * ) Notice: Subject to any disclaimer, the term of this patent is extended or adjusted under 35 U.S.C. 154(b) by 1018 days.

(21) Appl. No.: 10/813,402

(22) Filed: Mar. 31, 2004

(65) Prior Publication Data

US 2005/0068935 A1    Mar. 31, 2005

(51) Int. Cl.
*H04L 12/28* (2006.01)
(52) U.S. Cl. ............... 370/401; 370/392; 370/252; 370/352; 726/14
(58) Field of Classification Search .......... 370/392, 370/252, 401; 709/235; 726/4, 14
See application file for complete search history.

(56) References Cited

U.S. PATENT DOCUMENTS

| 6,321,267 | B1 * | 11/2001 | Donaldson ............... 709/229 |
| 6,483,912 | B1 | 11/2002 | Kalmanek, Jr. et al. |
| 6,711,147 | B1 * | 3/2004 | Barnes et al. ............ 370/338 |
| 7,069,432 | B1 * | 6/2006 | Tighe et al. ............. 713/151 |
| 2004/0111642 | A1 * | 6/2004 | Peles ....................... 713/201 |
| 2005/0022027 | A1 * | 1/2005 | Bonn et al. .............. 713/201 |
| 2005/0238151 | A1 * | 10/2005 | Brown et al. .......... 379/114.01 |
| 2006/0150243 | A1 * | 7/2006 | French et al. ............ 726/11 |

FOREIGN PATENT DOCUMENTS

| EP | 0 465 016 A2 | 1/1992 |
| EP | 0 743 777 A2 | 11/1996 |
| EP | 0 820 176 A2 | 1/1998 |
| JP | 06-095991 | 4/1994 |
| JP | 2002-232487 | 8/2002 |

OTHER PUBLICATIONS

European Office Action, Jul. 3, 2008.
3rd Generation Partnership Project; Technical Specification Group Services and System Aspects; 3G Security; Network Domain Security; IP network layer security (Release 6), 3GPP TS 33.210 v6.0.0, Dec. 2002.
3rd Generation Partnership Project; Technical Specification Group Services and System Aspects; 3G Security; Network Domain Security; IP network layer security (Release 6), 3GPP TS 33.210 v6.3.0, Sep. 2003.
Jennings et al., "Private Extensions to the Session Initiation Protocol (SIP) for Asserted Identity within Trusted Networks", RFC 3325, Nov. 2002.
Japanese Office Action, Dated Mar. 3, 2009, Issued on Japanese Application No. 2006-530733.
C. Jennings et al., "Private Extensions to the Session Initiation Protocol (SIP) for Asserted Identity within Trusted Networks," RFC 3325, Nov. 2002.
Japanese Office Action dated Jul. 31, 2008 (with translation).

* cited by examiner

*Primary Examiner*—Duc C Ho
(74) *Attorney, Agent, or Firm*—Mintz, Levin, Cohn, Ferris, Glovsky and Popeo, P.C.

(57) ABSTRACT

A method of communication between a calling party in a first network and a called party in a second network is disclosed. The method comprises determining in the first network an address associated with the called party. The method also comprises determining, based on the address, if the called party is in a trusted network, and controlling the communication between the called party and the calling party in dependence on if the called party is in a trusted network.

6 Claims, 3 Drawing Sheets

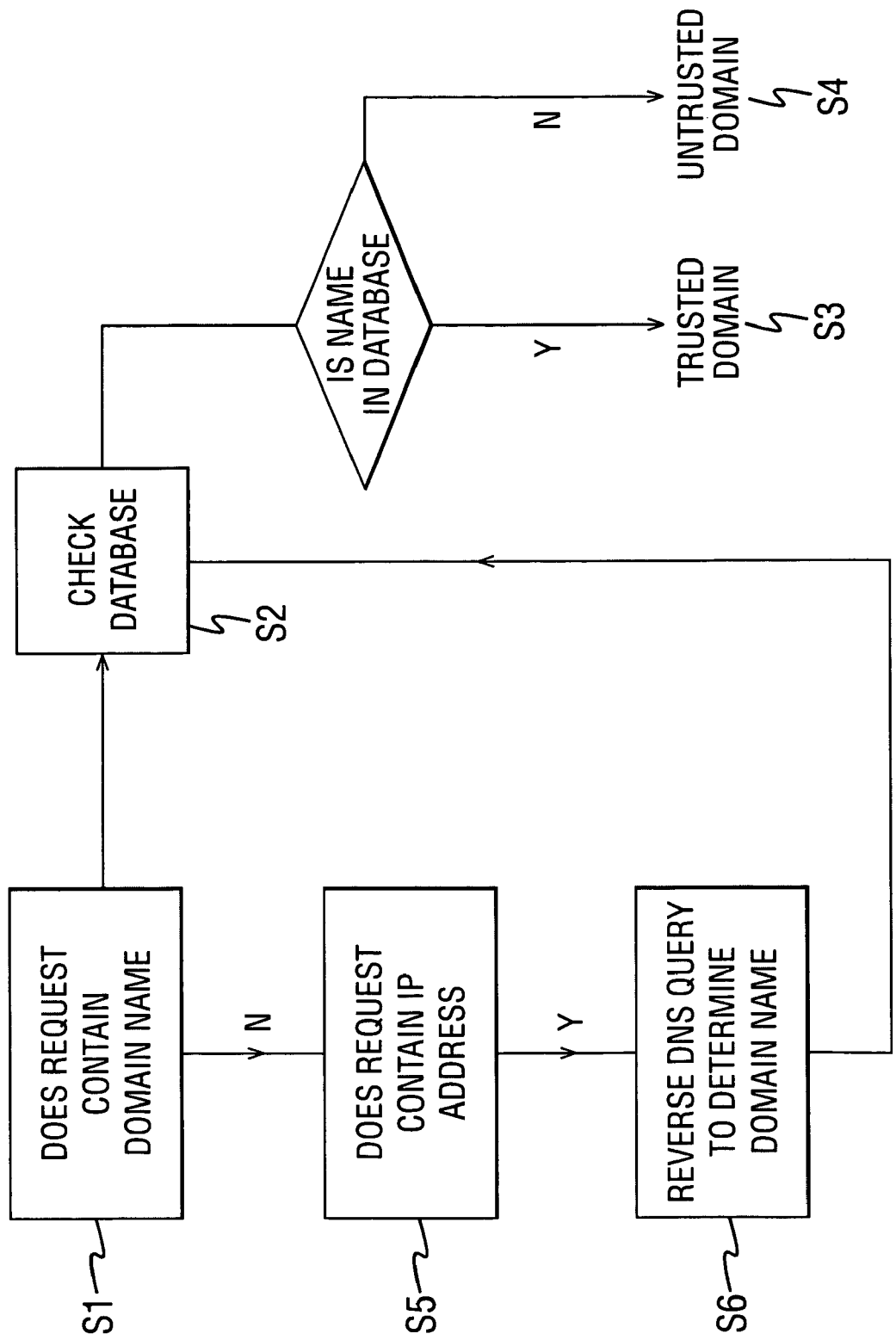

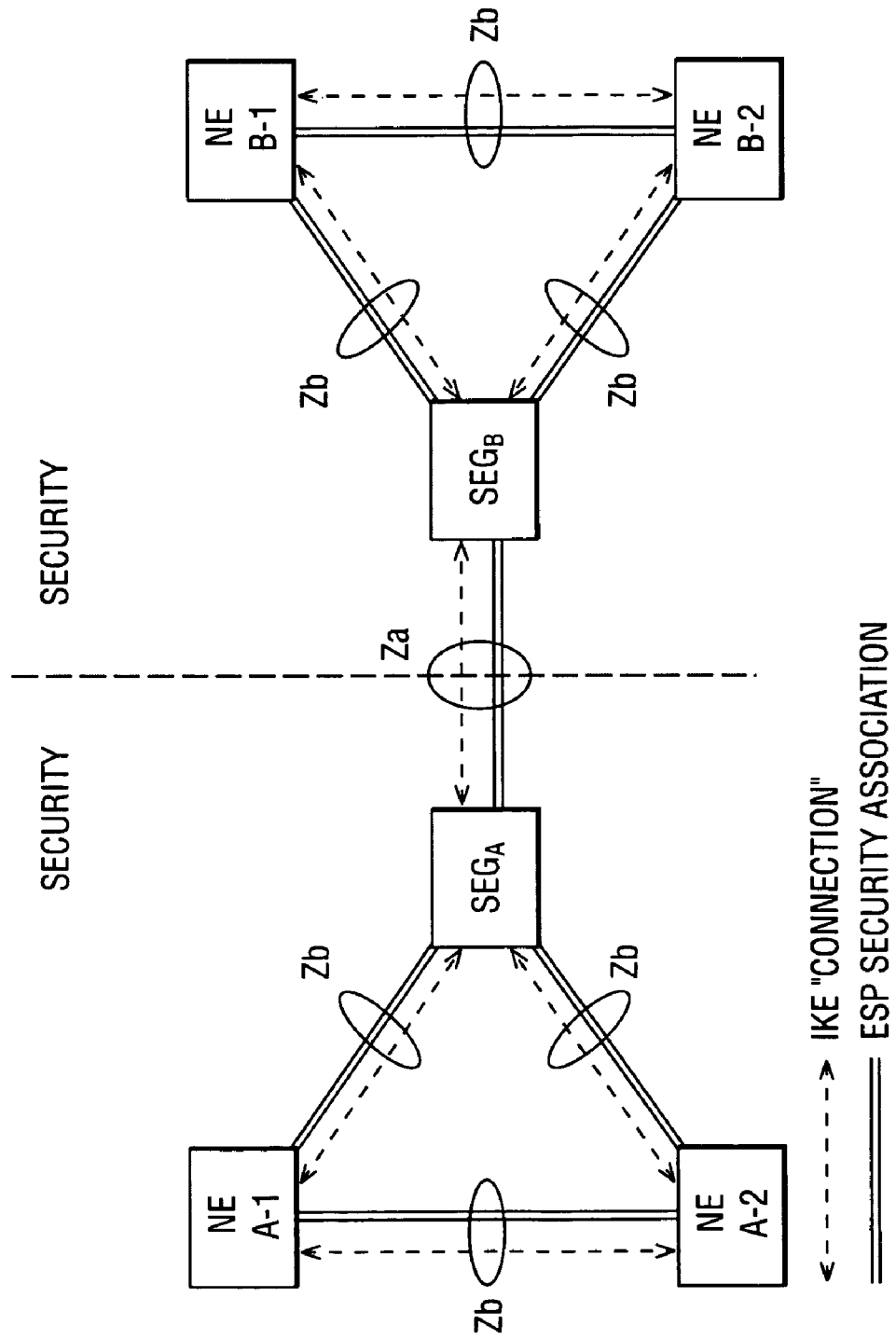
FIG. 3: NDS architecture for IP-based protocols

METHOD OF COMMUNICATION

BACKGROUND OF THE INVENTION

1. Field of the Invention

The invention relates to communication method.

2. Description of the Related Art

A communication system can be seen as a facility that enables communication sessions between two or more entities such as user equipment and/or other nodes associated with the communication system. The communication may comprise, for example, communication of voice, data, multimedia and so on. A session may, for example, be a telephone call between users or multi-way conference session, or a communication session between user equipment and an application server (AS), for example a service provider server. The establishment of these sessions generally enables a user to be provided with various services.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems providing wireless communication for user equipment are known. An example of the wireless systems is the public land mobile network (PLMN). The PLMNs are typically based on cellular technology. In cellular systems, a base transceiver station (BTS) or similar access entity serves wireless user equipment (UE) known also as mobile stations (MS) via a wireless interface between these entities. The communication on the wireless interface between the user equipment and the elements of the communication network can be based on an appropriate communication protocol. The operation of the base station apparatus and other apparatus required for the communication can be controlled by one or several control entities. The various control entities may be interconnected.

One or more gateway nodes may also be provided for connecting the cellular network to other networks e.g. to a public switched telephone network (PSTN) and/or other communication networks such as an IP (Internet Protocol) and/or other packet switched data networks. In such arrangement the mobile communications network provides an access network enabling a user with a wireless user equipment to access external networks, hosts, or services offered by specific service providers. The access point or gateway node of the mobile communication network then provides further access to an external network or an external host. For example, if the requested service is provided by a service provider located in other network, the service request is routed via the gateway to the service provider. The routing may be based on definitions in the mobile subscriber data stored by a mobile network operator.

An example of the services that may be offered for user such as the subscribers to a communication systems is the so called multimedia services. Some of the communication systems enabled to offer multimedia services are known as Internet Protocol (IP) Multimedia networks. IP Multimedia (IM) functionalities can be provided by means of an IP Multimedia Core Network (CN) subsystem, or briefly IP Multimedia subsystem (IMS). The IMS includes various network entities for the provision of the multimedia services. The IMS services are intended to offer, among other services, IP connections between mobile user equipment.

The third generation partnership project (3GPP) has defined use of the general packet radio service (GPRS) for the provision of the IMS services, and therefore this will be used in the following as an example of a possible backbone communication network enabling the IMS services. The exemplifying general packet radio service (GPRS) operation environment comprises one or more sub-network service areas, which are interconnected by a GPRS backbone network. A sub-network comprises a number of packet data service nodes (SN). In this application the service nodes will be referred to as serving GPRS support nodes (SGSN). Each of the SGSNs is connected to at least one mobile communication network, typically to base station systems. The connection is typically by way of radio network controllers (RNC) or other access system controllers such as base stations controllers (BSC) in such a way that packet service can be provided for mobile user equipment via several base stations. The intermediate mobile communication network provides packet-switched data transmission between a support node and mobile user equipment. Different sub-networks are in turn connected to an external data network, e.g. to a public switched data network (PSPDN), via gateway GPRS support nodes (GGSN). The GPRS services thus allow packet data transmission between mobile data terminals and external data networks.

In such a network, a packet data session is established to carry traffic flows over the network. Such a packet data session is often referred as a packet data protocol (PDP) context. A PDP context may include a radio access bearer provided between the user equipment, the radio network controller and the SGSN, and switched packet data channels provided between the serving GPRS support node and the gateway GPRS support node.

A data communication session between the user equipment and other party would then be carried on the established PDP context. Each PDP context can carry more than one traffic flow, but all traffic flows within one particular PDP context are treated the same way as regards their transmission across the network. The PDP context treatment requirement is based on PDP context treatment attributes associated with the traffic flows, for example quality of service and/or charging attributes.

The Third Generation Partnership Project (3GPP) has also defined a reference architecture for the third generation (3G) core network which will provide the users of user equipment with access to the multimedia services. This core network is divided into three principal domains. These are the Circuit Switched (CS) domain, the Packet Switched (PS) domain and the Internet Protocol Multimedia (IM) domain. The latter of these, the IM domain, is for ensuring that multimedia services are adequately managed.

The IM domain supports the Session Initiation Protocol (SIP) as developed by the Internet Engineering Task Force (IETF). Session Initiation Protocol (SIP) is an application-layer control protocol for creating, modifying and terminating sessions with one or more participants (endpoints). SIP was generally developed to allow for initiating a session between two or more endpoints in the Internet by making these endpoints aware of the session semantics. A user connected to a SIP based communication system may communicate with various entities of the communication system based on standardised SIP messages. User equipment or users that run certain applications on the user equipment are registered with the SIP backbone so that an invitation to a particular session can be correctly delivered to these endpoints. To achieve this, SIP provides a registration mechanism for devices and users, and it applies mechanisms such as location servers and registrars to route the session invitations appropriately. Examples of the possible sessions that may be provided by means of SIP signalling include Internet multimedia conferences, Internet telephone calls, and multimedia distribution.

Reference is made to IETF document RFC 3325 which is hereby incorporated by reference. This document describes private extensions to SIP that enable a network of trusted SIP servers to assert the identity of end users or end systems, and to convey indications of end-user requested privacy. The use of these extensions is applicable inside a 'Trust Domain' as defined in Short term requirements for Network Asserted Identity. Nodes in such a Trust Domain are explicitly trusted by its users and end-systems to publicly assert the identity of each party, and to be responsible for withholding that identity outside of the Trust Domain when privacy is requested.

In order to be able to apply the privacy procedures described in RFC3325, there is a need to detect the trustworthiness of the next hop network. If the next hop is trusted, then the procedures related to the different privacy options are delegated to the next hop. Otherwise the privacy procedures need to be executed.

As an example, in case the caller asks for identity privacy, the P-Asserted-Identity header has to be removed before it reaches the called party. A message sent by the caller contains a header identifying the sender, called a P-Asserted-Identity header. The format of this header if the sender is a user with a publicly-known user identification is: <sip:user1_public1@home1.net> The home network of the caller has to remove the header only in case the home network of the called party is not trusted. If the home network of the called party (which is the next hop for the home network of the caller) is trusted, then the home network of the caller will not remove the header. This is needed to be compliant with RFC3325, which says that the P-Asserted-Identity header has to be removed by the last element in the trusted domain.

In RFC 3325, the mechanism proposed relies on the header field called 'P-Asserted-Identity' that contains a URI (commonly a SIP URI) and an optional display-name. A proxy server which handles a message can, after authenticating the originating user in some way (for example: Digest authentication), insert such a P-Asserted-Identity header field into the message and forward it to other trusted proxies. A proxy that is about to forward a message to a proxy server or UA that it does not trust removes all the P-Asserted-Identity header field values if the user requested that this information be kept private. Users can request this type of privacy.

For the procedures to be applied in the correct place, the trustworthiness of the next hop has to be detected in some way.

SUMMARY OF THE INVENTION

According to a first aspect of the invention, there is provided a method of communication between a calling party in a first network and a called party in a second network comprising the steps of:
  determining in the first network an address associated with said called party;
  determining based on said address if said called party is in a trusted network; and
  controlling the communication between the called party and the calling party in dependence on if said called party is in a trusted network.

According to a second aspect, there is provided a communications system comprising a first network having a calling party and a second network having a calling party, said first network comprising:
  determining means for determining an address associated with said called party;
  determining means for determining based on said address if said called party is in a trusted network; and
  control means for controlling the communication between the called party and the calling party in dependence on if said called party is in a trusted network.

According to a third aspect, there is provided a first network having a calling party arranged to call a calling party in a second network, said first network comprising:
  determining means for determining an address associated with said called party;
  determining means for determining based on said address if said called party is in a trusted network; and
  control means for controlling the communication between the called party and the calling party in dependence on if said called party is in a trusted network.

According to a fourth aspect, there is provided a method of communication between a calling party in a first network and a called party in a second network comprising the steps of:
  determining in the first network if there is a secure connection with said second network; and
  if it is determined that there is no secure connection with said second network discarding or modifying a message from the calling party to the called party.

BRIEF DESCRIPTION OF THE DRAWINGS

For better understanding of the invention, reference will now be made by way of example to the accompanying drawings in which:

FIG. 2 is a flowchart illustrating the operation of one embodiment of the invention;

FIG. 3 shows a context in which an embodiment of the invention may be provided.

DETAILED DESCRIPTION OF THE PREFERRED EMBODIMENTS

Figure 1:
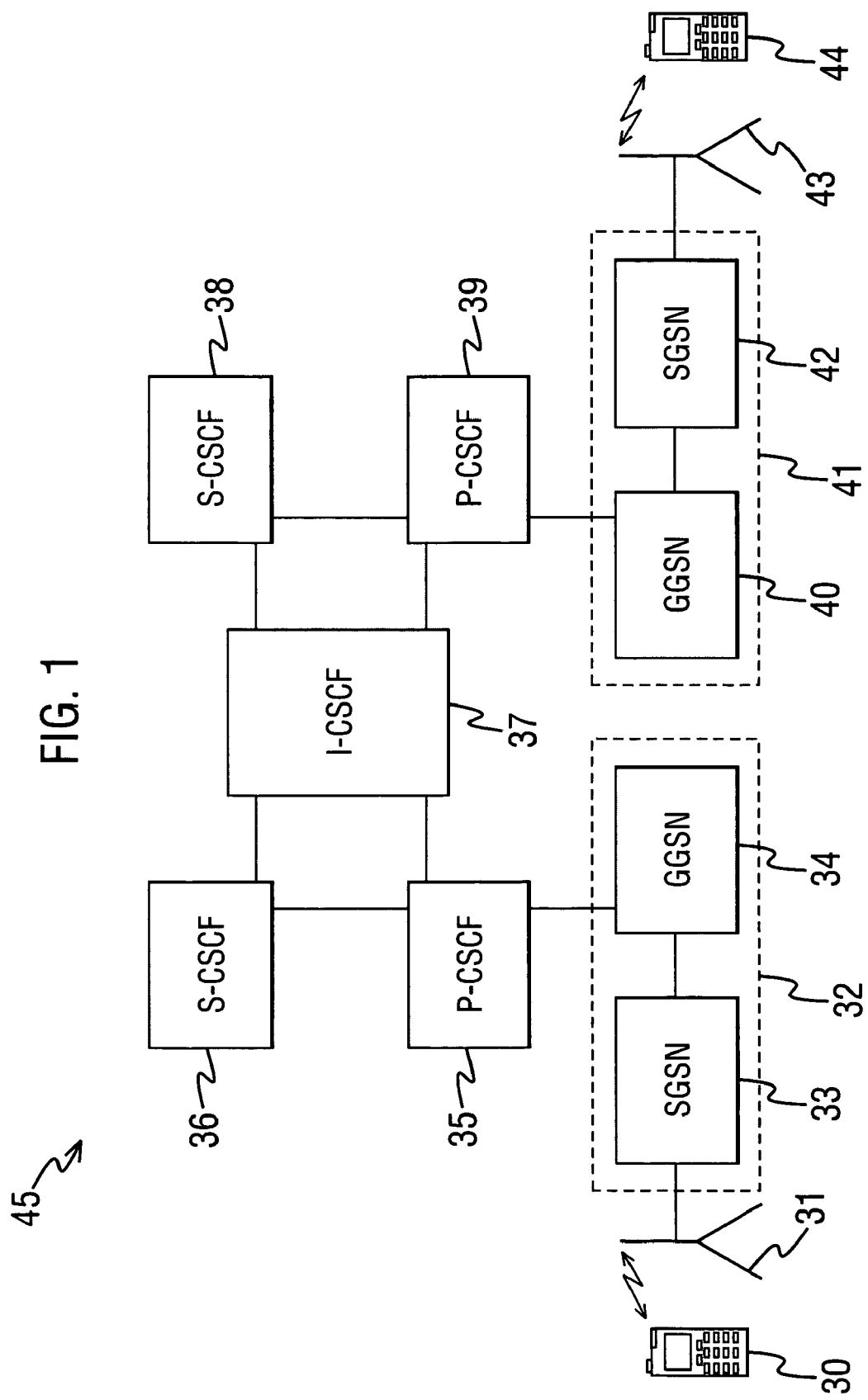
FIG. 1 shows a communication system wherein the invention may be embodied.

Embodiments of the present invention relate particularly but not exclusively to Rel-5 IMS networks. Embodiments of the invention may also be applicable to other versions of the IMS network. Embodiments of the invention may be applicable to other SIP networks. Some embodiments of the invention may find wider application outside the SIP and IMS environments.

Certain embodiments of the present invention will be described by way of example, with reference to the exemplifying architecture of a third generation (3G) mobile communications system. However, it will be understood that certain embodiments may be applied to any other suitable form of network. A mobile communication system is typically arranged to serve a plurality of mobile user equipment usually via a wireless interface between the user equipment and base station of the communication system. The mobile communication system may logically be divided between a radio access network (RAN) and a core network (CN).

Reference is made to FIG. 1 which shows an example of a network architecture wherein the invention may be embodied. FIG. 1 shows an IP Multimedia Network 45 for offering IP multimedia services for IP Multimedia Network subscribers. IP Multimedia (IM) functionalities can be provided by means of a Core Network (CN) subsystem including various entities for the provision of the service.

Base stations 31 and 43 are arranged to transmit signals to and receive signals from mobile user equipment 30 and 44 of mobile users i.e. subscribers via a wireless interface. Correspondingly, each of the mobile user equipment is able to transmit signals to and receive signals from the base station via the wireless interface. In the simplified presentation of FIG. 1, the base stations 31 and 43 belong to different radio access networks (RAN). In the shown arrangement each of the user equipment 30, 44 may access the IMS network 45 via the two access networks associated with base stations 31 and 43, respectively. It shall be appreciated that, although, for clarity, FIG. 1 shows the base stations of only two radio access networks, a typical mobile communication network usually includes a number of radio access networks.

The 3G radio access network (RAN) is typically controlled by appropriate radio network controller (RNC). This controller is not shown in order to enhance clarity. A controller may be assigned for each base station or a controller can control a plurality of base stations. Solutions wherein controllers are provided both in individual base stations and in the radio access network level for controlling a plurality of base stations are also known. It shall thus be appreciated that the name, location and number of the network controllers depends on the system.

The mobile user may use any appropriate mobile device adapted for Internet Protocol (IP) communication to connect the network. For example, the mobile user may access the cellular network by means of a Personal computer (PC), Personal Data Assistant (PDA), mobile station (MS) and so on. The following examples are described in the context of mobile stations.

One skilled in the art is familiar with the features and operation of a typical mobile station. Thus, a detailed explanation of these features is not necessary. It is sufficient to note that the user may use a mobile station for tasks such as for making and receiving phone calls, for receiving and sending data from and to the network and for experiencing e.g. multimedia content. A mobile station is typically provided with processor and memory means for accomplishing these tasks. A mobile station may include antenna means for wirelessly receiving and transmitting signals from and to base stations of the mobile communication network. A mobile station may also be provided with a display for displaying images and other graphical information for the user of the mobile user equipment. Speaker means may are also be provided. The operation of a mobile station may be controlled by means of an appropriate user interface such as control buttons, voice commands and so on.

It shall be appreciated that although only two mobile stations are shown in FIG. 1 for clarity, a number of mobile stations may be in simultaneous communication with each base station of the mobile communication system. A mobile station may also have several simultaneous sessions, for example a number of SIP sessions and activated PDP contexts. The user may also have a phone call and be simultaneously connected to at least one other service.

The core network (CN) entities typically include various control entities and gateways for enabling the communication via a number of radio access networks and also for interfacing a single communication system with one or more communication system such as with other cellular systems and/or fixed line communication systems. In FIG. 1 serving GPRS support nodes 33, 42 and gateway GPRS support nodes 34, 40 are for provision of support for GPRS services 32, 41, respectively, in the network.

The radio access network controller is typically connected to an appropriate core network entity or entities such as, but not limited to, the serving general packet radio service support nodes (SGSN) 33 and 42. Although not shown, each SGSN typically has access to designated subscriber database configured for storing information associated with the subscription of the respective user equipment.

User equipment within the radio access network may communicate with a radio network controller via radio network channels which are typically referred to as radio bearers (RB). Each user equipment may have one or more radio network channel open at any one time with the radio network controller. The radio access network controller is in communication with the serving GPRS support node via an appropriate interface, for example on an Iu interface.

The serving GPRS support node, in turn, typically communicates with a gateway GPRS support node via the GPRS backbone network 32, 41. This interface is commonly a switched packet data interface. The serving GPRS support node and/or the gateway GPRS support node are for provision of support for GPRS services in the network.

Overall communication between user equipment in an access entity and a gateway GPRS support node is generally provided by a packet data protocol (PDP) context. Each PDP context usually provides a communication pathway between particular user equipment and the gateway GPRS support node and, once established, can typically carry multiple flows. Each flow normally represents, for example, a particular service and/or a media component of a particular service. The PDP context therefore often represents a logical communication pathway for one or more flow across the network. To implement the PDP context between user equipment and the serving GPRS support node, radio access bearers (RAB) need to be established which commonly allow for data transfer for the user equipment. The implementation of these logical and physical channels is known to those skilled in the art and is therefore not discussed further herein.

The user equipment 30, 44 may connect, via the GPRS network, to application servers that are generally connected to the IMS.

The communication systems have developed such that services may be provided for the user equipment by means of various functions of the network that are handled by network entities known as servers. For example, in the current third generation (3G) wireless multimedia network architectures it is assumed that several different servers are used for handling different functions. These include functions such as the call session control functions (CSCFs). The call session control functions may be divided into various categories such as a proxy call session control function (P-CSCF) 35 and 39, interrogating call session control function (I-CSCF) 37, and serving call session control function (S-CSCF) 36 and 38. A user who wishes to use services provided by an application server via the IMS system may need to register with a serving control entity. The serving call session control function (S-CSCF) may form in the 3G IMS arrangements the entity a user needs to be registered with in order to be able to request for a service from the communication system. The CSCFs may define an IMS network of a UMTS system.

It shall be appreciated that similar function may be referred to in different systems with different names. For example, in certain applications the CSCFs may be referenced to as the call state control functions.

Communication systems may be arranged such that a user who has been provided with required communication resources by the backbone network has to initiate the use of services by sending a request for the desired service over the communication system. For example, a user may request for a session, transaction or other type of communications from an appropriate network entity.

In one embodiment of the present invention, there is a database at the S-CSCF of the home network of the calling party which lists all the known IMS network domain names and IP addresses the home network trusts.

A database containing the domain name of the IMS networks and the corresponding IP addresses of the I-CSCFs has to be maintained in a SIP level database. As SIP requests may contain either domain names or IP addresses in the Request (R)-universal resource indicator. It is not enough to store the domain names into the database. The calling party thus can check if the called party is in a trusted or untrusted network by seeing in the domain name or IP address associated with the called party are in the database.

It is however possible in an alternative embodiment of the invention to make reverse DNS domain name server queries whenever an IP address is received instead of a domain name in the R-URI. Thus, the following simplified solution is also possible which will be described with reference to FIG. 2:

A database is kept with the domain names of the IMS networks the home network trusts.

In step S1 it is determined in the request contains a domain name.

If so the next step is step S2 where it is checked to see if the domain is in the database. If so the next hop is considered a trusted domain and the corresponding procedures are applied (step S3). If the domain is not in the database, then consider the next hop an untrusted domain, and apply the corresponding procedures—step S4.

If the called party is an untrusted party, the message may be discarded or alternatively modified. If the message is modified, information identifying the calling party will be removed. This information may be the P-Asserted header. This will be done if the calling party has requested privacy, ie that their identity be kept private.

If the request does not contain the domain name it is determined if a request with an IP address in R-URI is received— step S5. Step S5 and S1 may be combined in a single step. If the request contains an IP address then a then a reverse DNS query is made to find out the corresponding domain—step 6. That is a request is sent to the Domain name server for the name of the domain associated with the IP address. The next step will then be step S2 with the checking of the database.

In a further embodiment of the invention, a database is kept only at the S-CSCF of the home network which lists there all the known IMS network domain names the home network trusts.

If the R-URI contains an IP address instead of a domain name (and thus can not be checked in the database), then it is simply assumed that the next hop is an untrusted domain.

In a still further embodiment of the invention, the NDS network domain security is configured in the security gateways (SPD) in such a way, that an IP packet coming from a CSCF of the domain the gateway is part of, would be sent over a secure connection. If a secure connection towards the destination does not exists, the packet is simply discarded and an ICMP Internet control message protocol message generated.

The ICMP is an Internet protocol which delivers error and control messages between a gateway or a destination host and the source host about IP datagram processing. ICMP can for example report an error in the IP datagram processing. ICMP is usually part of the IP protocol. Thus, the home network always assumes the next hop is trusted and does not remove the P-Asserted-Identity. If it happens that the next hop is not trusted, then the packet is discarded, and does not reach the called party.

The consequence of this solution is, that CSCF will only be able to communicate with SIP entities belonging to a trusted domain.

Reference is made to Third Generation Partnership Project specification number TS33.210 version 3.3.0 which is hereby incorporated by reference. The document describes a network domain security architecture outline. Reference is made to FIG. 3 which shows this architecture to which embodiments of the present invention can be applied.

An explanation will firstly be given regarding the Za and Zb interfaces that can exist between networks and within networks respectively. This explanation is taken from the 3GPP TS 33.210 V6.0.0 (2002-12) Technical Specification, Release 6. FIG. 3 shows two security domains and the Za and Zb interfaces between entities of these domains.

The interfaces are defined for protection of native IP based protocols:

Za-Interface (SEG-SEG)

The Za-interface covers all NDS/IP (Network Domain Security/Internet Protocol) traffic between security domains. The SEGs (Security Gateways) use IKE (Internet Key Exchange) to negotiate, establish and maintain a secure ESP (Encapsulating Security Payload) tunnel between them. Subject to roaming agreements, the inter-SEG tunnels would normally be available at all times, but they can also be established as needed. ESP shall be used with both encryption and authentication/integrity, but an authentication/integrity only mode is allowed. The tunnel is subsequently used for forwarding NDS/IP traffic between security domain A and security domain B.

One SEG can be dedicated to only serve a certain subset of all roaming partners. This will limit the number of SAs and tunnels that need to be maintained.

All security domains compliant with this specification shall operate the Za-interface.

Zb-Interface (NE-SEG/NE-NE)

The Zb-interface is located between SEGs and NEs and between NEs within the same security domain. The Zb-interface is optional for implementation. If implemented, it shall implement ESP+IKE.

On the Zb-interface, ESP shall always be used with authentication/integrity protection. The use of encryption is optional. The ESP Security Association shall be used for all control plane traffic that needs security protection.

Whether the Security Association is established when needed or a priori is for the security domain operator to decide. The Security Association is subsequently used for exchange of NDS/IP traffic between the NEs.

The security policy established over the Za-interface is subject to roaming agreements. This differs from the security policy enforced over the Zb-interface, which is unilaterally decided by the security domain operator.

The basic idea to the NDS/IP architecture is to provide hop-by-hop security. This is in accordance with the chained-tunnels or hub-and-spoke models of operation. The use of hop-by-hop security also makes it easy to operate separate security policies internally and towards other external security domains.

In NDS/IP only the Security Gateways (SEGs) shall engage in direct communication with entities in other security domains for NDS/IP traffic. The SEGs will then establish and maintain IPsec secured ESP Security Association in tunnel mode between security domains. SEGs will normally maintain at least one IPsec tunnel available at all times to a particular peer SEG. The SEG will maintain logically separate SAD and SPD databases for each interface.

The NEs may be able to establish and maintain ESP Security Associations as needed towards a SEG or other NEs within the same security domain. All NDS/IP traffic from a NE in one security domain towards a NE in a different security domain will be routed via a SEG and will be afforded hop-by-hop security protection towards the final destination.

Operators may decide to establish only one ESP Security Association between two communicating security domains. This would make for coarse-grained security granularity. The benefits to this is that it gives a certain amount of protection against traffic flow analysis while the drawback is that one will not be able to differentiate the security protection given between the communicating entities. This does not preclude negotiation of finer grained security granularity at the discretion of the communicating entities.

In embodiments of the invention, the SEG of the calling party will determine if the packet for the called party is to be sent over a secure connection to the SEG of the called party. If there is no secure connection the packet is discarded. If there is a secure connection the packet is sent.

In one modification, if there is no secure connection, the SEG of the calling party will remove the identity information from the message, that is the P-Asserted header. The modified message is then sent to the called party.

In embodiments of the invention, P-asserted header information is removed from the packet. In alternative embodiments of the invention which do not have the P-Asserted information, identification information relating to the identity of the calling party will be removed.

The database is described as storing the identity of trusted parties only. In one modification it could store only the identity of untrusted parties or both the untrusted and trusted parties along with information indicating if they are trusted or not.

It should be appreciated that the description of one embodiment where there is a GPRS system is by way of example only and other systems may be used in alternative embodiments of the invention.

It should be appreciated that while embodiments of the invention have been described in relation to user equipment such as mobile stations, embodiments of the invention are applicable to any other suitable type of user equipment.

The examples of the invention have been described in the context of an IMS system and GPRS networks. This invention is also applicable to any other access techniques. Furthermore, the given examples are described in the context of SIP networks with SIP capable entities. This invention is also applicable to any other appropriate communication systems, either wireless or fixed line systems and standards and protocols.

The embodiments of the invention have been discussed in the context of call state control functions. Embodiments of the invention can be applicable to other network elements where applicable.

It is also noted herein that while the above describes exemplifying embodiments of the invention, there are several variations and modifications which may be made to the disclosed solution without departing from the scope of the invention as defined in the appended claims.

The invention claimed is:

1. A method, comprising:
   determining, in a first network, an address associated with a called party of a second network, wherein the address is included in a session initiation protocol request;
   determining based on said address if said called party is in a trusted network, wherein the determining if the called party of the second network is in a trusted network comprises checking if the address is contained in a database of trusted networks, wherein the database is provided in at least one of a serving call session control function and a security gateway, and wherein the database is in the first network; and
   controlling a communication between the called party and a calling party of the first network based on whether said called party of the second network is in the trusted network, the communication comprising at least one message for the called party, wherein if the called party of the second network is not in the trusted network, the controlling comprises modifying the at least one message, wherein the controlling is performed by at least one processor.

2. The method as claimed in claim 1, wherein the determining if the called party is in the trusted network is performed in a gateway of the further comprises determining if a connection from a calling network to a called network is secured.

3. A method, comprising:
   determining, in a first network, an internet protocol address associated with a called party of a second network;
   determining based on said internet protocol address if said called party of the second network is in a trusted network, wherein the determining if the called party is in a trusted network comprises checking if the internet protocol address is contained in a database in the first network of trusted internet protocol multimedia subsystem networks, wherein said database comprises domain names associated with the trusted internet protocol multimedia subsystem networks and internet protocol addresses of the trusted internet protocol multimedia subsystem networks, wherein if a determination is made that the internet protocol address is contained in the domain names, the called party is assumed to be in a trusted network; and
   controlling a communication between the called party and a calling party of the first network based on whether said called party is in the trusted network, the communication comprising at least one message for the called party, wherein if the called party is not in the trusted network the controlling compromises modifying the at least one message, wherein controlling is performed by at least one processor.

4. The method as claimed in claim 3, wherein the determining if the called party is in the trusted network further comprises determining if a connection from a calling network to a called network is secured.

5. An apparatus, comprising:
   a first determiner configured to determine an address associated with a called party located in another network, wherein the address is included in a session initiation protocol request;
   a second determiner configured to determine, based on said address, if said called party of the another network is in a trusted network, the second determiner being configured to check if the address is contained in a database of trusted networks, wherein said database comprises domain names associated with the trusted networks and internet protocol addresses of the trusted networks, wherein if a determination is made that the address is contained in the domain names, the second determiner is further configured to assume that the called party is in a trusted network; and a controller configured to control communication between the called party and a calling party, located in a network where the apparatus is located, based on if said called party is in the trusted network, the communication comprising at least one message for the called party, wherein if the called party is not in the trusted network, the at least one message for the called party is modified, wherein the database is located in the network.

6. A method comprising:

determining, at a serving call session control function in an internet protocol multimedia subsystem network, a trust relation with a called party in another network, wherein the determining if the called party of the another network is in a trusted relationship comprises checking whether an address, included in a session initiation protocol request, is contained in a database of trusted networks provided in at least one of a serving call session control function and a security gateway, wherein the address is associated with the called party in the another network, wherein the database is located in an internet protocol multimedia subsystem network; and controlling a communication of a message to the called party based on the determination, wherein if the called party is not trusted, the call session control function removes identity information relating to the calling party from the message, and if the called party is trusted, said identity information is retained, wherein controlling is performed by at least one processor.

* * * * *